A. JOHN.
SPRING WHEEL.
APPLICATION FILED JUNE 9, 1917.
1,254,505.
Patented Jan. 22, 1918.
2 SHEETS—SHEET 1.
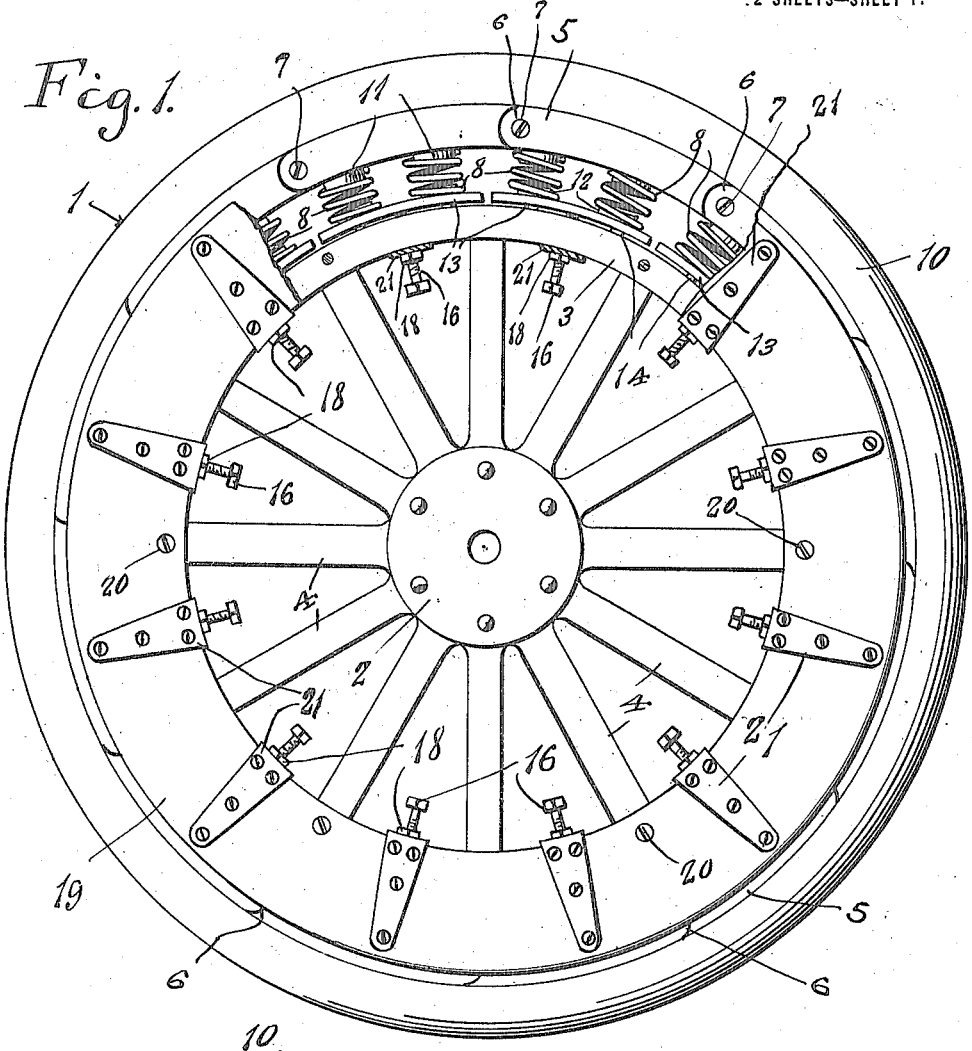

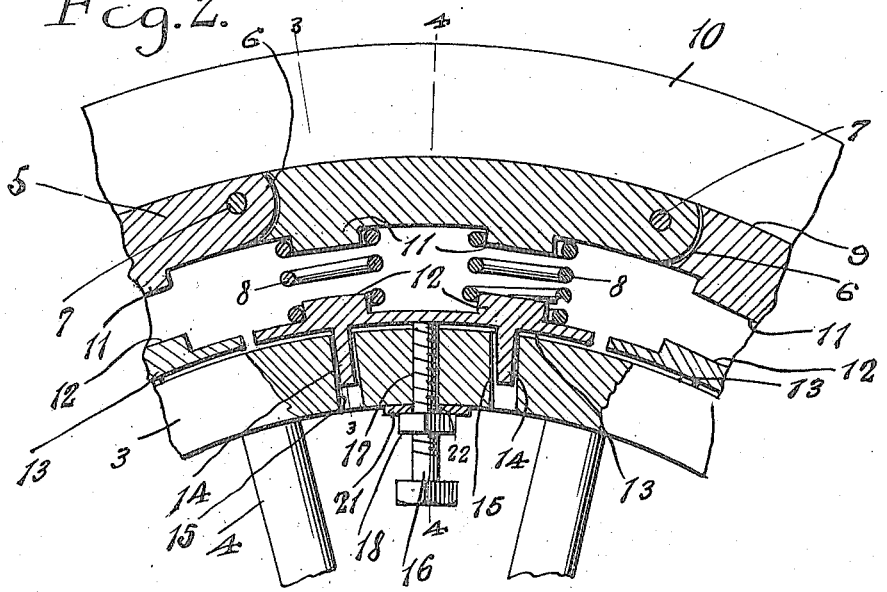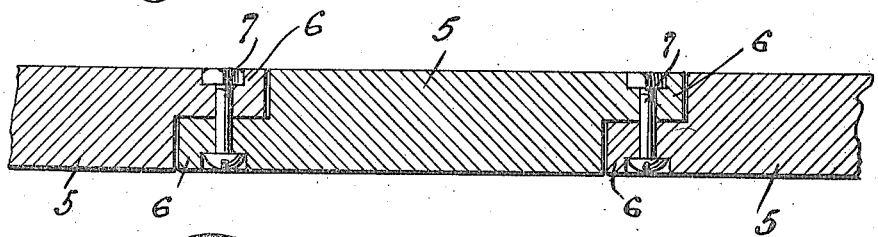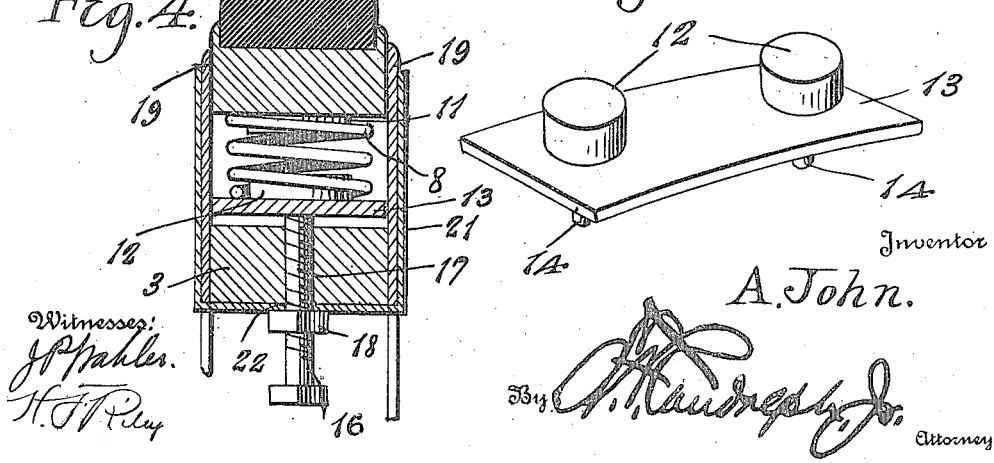

UNITED STATES PATENT OFFICE.

ADAM JOHN, OF HAVERHILL, MASSACHUSETTS.

SPRING-WHEEL.

1,254,505.

Specification of Letters Patent.  Patented Jan. 22, 1918.

Application filed June 9, 1917. Serial No. 173,792.

*To all whom it may concern:*

Be it known that I, ADAM JOHN, a citizen of the United States, residing at Haverhill, in the county of Essex and State of Massachusetts, have invented certain new and useful Improvements in Spring-Wheels; and I do hereby declare the following to be a full, clear, and exact description of the invention, such as will enable others skilled in the art to which it appertains to make and use the same.

This invention relates to a spring wheel.

The object of the present invention is to improve the construction of spring wheels and to provide a simple, practical and efficient spring wheel of strong, durable and comparatively inexpensive construction designed for use on automobiles and various other motor vehicles and the like, and capable of affording the resiliency of a pneumatically tired wheel and of eliminating puncture and other tire troubles.

A further object of the invention is to provide a spring wheel of this character equipped with means for effecting a ready adjustment of the tension of the springs to adapt the same to the character of the load.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a side elevation partly in section of a spring wheel constructed in accordance with this invention.

Fig. 2 is a central longitudinal sectional view.

Fig. 3 is a transverse sectional view on the line 3—3 of Fig. 2.

Fig. 4 is a transverse sectional view on the line 4—4 of Fig. 2.

Fig. 5 is a detail sectional view of a portion of the flexible outer rim.

Fig. 6 is a detail view of one of the adjustable spring tensioning plates.

Like numerals of reference designate corresponding parts in the several figures of the drawings.

In the accompanying drawings, in which is illustrated the preferred embodiment of the invention, 1 designates an inner wheel of any desired construction consisting of a hub 2, a felly 3 and spokes 4 forming a rigid inner structure. The wheel is provided with a flexible outer rim 5 composed of a plurality of sections having overlapped terminals 6 pivotally connected by transverse bolts 7, or other suitable pivots. The sections 5 are recessed to form the terminals 6 and their side faces are arranged in the same plane and in flush relation as clearly shown in Fig. 5 of the drawings. The flexible rim is supported by coiled springs 8 and it is provided with an exterior annular groove 9 adapted to receive a solid rubber tire 10, but any other suitable tire may of course be employed.

The coiled springs are radially arranged and their outer ends are fitted around bosses or lugs 11 preferably formed integral with the outer rim sections and projecting from the inner faces thereof. The inner ends of the coiled springs fit around and engage inner bosses or lugs 12 of adjustable spring tensioning plates 13 curved to conform to the periphery of the rigid felly 3 and provided at the terminal portions with guide stems 14 located centrally of the inner bosses or lugs 12 and operating in openings or slots 15 of sufficient size to permit the inward and outward adjustment of the spring tensioning plates. The plates are adjusted or forced outwardly to increase the tension of the springs by means of screws 16 mounted in the felly 3 and engaging threaded openings 17 thereof and equipped with lock nuts 18 for securing the adjusting screws and the plates in their adjustment. The springs yieldably support the inner wheel and are adapted to cushion the same and absorb jar or strains and shocks which will be dissipated and effectually prevented from being transmitted to the vehicle.

The wheel is equipped with flat annular side plates 19 secured by bolts 20 or other suitable fastening means to the fixed or rigid felly of the inner wheel and extending outwardly therefrom and terminating short of the outer periphery of the flexible outer rim. The ends of the terminal portions 6 are rounded and arcuate and the recesses, which receive the terminal portions 6, have arcuate end walls to permit free play of the sections on the transverse pivot bolts 7, and the side plates which are adapted to exclude dust and dirt from the space between the felly and flexible outer rim slidably receive the sections of the flexible outer rim and do not interfere with the movement of the same in the cushioning action of the springs. The wheel is preferably reinforced by yokes 21 of approximately U-shape constructed of suitable metal and provided with perforations 22 to receive the bolts or adjusting screws which are located centrally of the plates and preferably opposite the spaces between the lugs or bosses 11 of the outer rim sections, the plates 13 extending to opposite sides of the joints and the springs being located at the end portions of the said outer rim sections. The yokes are located exteriorly of the side plates and extend across the inner periphery of the felly of the inner wheel.

What is claimed is:

1. A spring wheel including an inner wheel, a flexible outer rim surrounding the inner wheel and composed of sections having transverse pivots connecting the sections, springs arranged in pairs and interposed between the inner wheel and the flexible rim, adjustable plates arranged concentric with the outer rim and guided on the inner wheel and being of approximately the length of the sections of the outer rim and receiving the pairs of springs, and radially arranged adjusting screws located between the guiding means thereof and engaging the plates at the inner faces of the same.

2. A spring wheel including an inner wheel, a flexible outer rim surrounding the inner wheel and composed of sections having transverse pivots connecting the sections, coiled springs arranged in pairs and interposed between the inner wheel and the flexible rim, adjustable plates of approximately the length of the sections of the outer rim arranged concentric with the latter and receiving the coiled springs, said plates being provided with inwardly extending stems arranged in pairs and guided in radial openings of the inner wheel, and radially arranged adjusting screws mounted on the inner wheel and operating between the said stems and engaging the plates at the inner faces of the same.

3. A spring wheel including an inner wheel, a flexible outer rim surrounding the inner wheel and composed of sections having transverse pivots connecting the sections, coiled springs arranged in pairs and interposed between the inner wheel and the flexible rim, adjustable plates of approximately the length of the sections of the outer rim arranged concentric with the latter and receiving the coiled springs, said plates being provided with inwardly extending stems arranged in pairs and guided in radial openings of the inner wheel, yokes embracing the inner wheel substantially centrally of the said plates, and radially arranged adjusting screws piercing the yokes and operating between the said stems for varying the tension of the springs, said screws engaging the plates at the inner faces thereof.

In testimony whereof I affix my signature in presence of two witnesses.

ADAM JOHN.

Witnesses:
M. I. LEWIS,
BENNETT S. JONES.